US008640936B2

(12) United States Patent
Ort

(10) Patent No.: US 8,640,936 B2
(45) Date of Patent: Feb. 4, 2014

(54) APPARATUS AND SYSTEM FOR SECURING AN ITEM TO A VEHICLE

(76) Inventor: John Ort, Highland, UT (US)

( * ) Notice: Subject to any disclaimer, the term of this patent is extended or adjusted under 35 U.S.C. 154(b) by 394 days.

(21) Appl. No.: 13/043,070

(22) Filed: Mar. 8, 2011

(65) Prior Publication Data

US 2012/0228351 A1 Sep. 13, 2012

(51) Int. Cl.
*B60R 11/00* (2006.01)
*E05B 65/12* (2006.01)
(52) U.S. Cl.
USPC ............. 224/535; 224/519; 70/258; 242/379; 242/379.2
(58) Field of Classification Search
USPC ............... 224/519, 535; 70/49, 258; 242/375, 242/375.2, 375.1, 379, 379.2, 376, 384, 242/398; 254/323; 280/478.1, 479.1
See application file for complete search history.

(56) References Cited

U.S. PATENT DOCUMENTS

| | | | |
|---|---|---|---|
| 4,807,899 A | 2/1989 | Belcher | |
| 5,072,962 A * | 12/1991 | Webb | 280/414.1 |
| 5,288,094 A * | 2/1994 | Putnam | 280/420 |
| 5,350,186 A * | 9/1994 | Hull et al. | 280/480.1 |
| 5,695,103 A * | 12/1997 | Duvernay et al. | 224/532 |
| 5,735,539 A * | 4/1998 | Kravitz | 280/506 |
| 5,752,639 A | 5/1998 | Rice | |
| 6,206,259 B1 | 3/2001 | Brungardt et al. | |
| 6,283,349 B1 | 9/2001 | Morris et al. | |
| 6,386,514 B1 | 5/2002 | Ray | |
| D458,579 S | 6/2002 | Adams et al. | |
| 6,494,477 B1 * | 12/2002 | Parker | 280/479.1 |
| 6,511,089 B1 | 1/2003 | Kores, Sr. | |
| 6,581,953 B2 | 6/2003 | Jerry | |
| 6,910,705 B1 | 6/2005 | Harwood et al. | |
| 6,948,734 B2 * | 9/2005 | Popham | 280/478.1 |
| 7,172,150 B1 * | 2/2007 | Hutchison et al. | 242/375.2 |
| 7,290,755 B1 | 11/2007 | Thibodeaux | |
| 7,407,149 B1 | 8/2008 | Zindell | |
| 7,425,013 B1 * | 9/2008 | Bartlett | 280/479.3 |
| 7,428,833 B2 * | 9/2008 | Tollefson | 70/49 |
| 7,523,629 B2 * | 4/2009 | Tollefson | 70/49 |
| 8,201,843 B2 * | 6/2012 | Neu et al. | 280/479.3 |
| 2002/0073746 A1 | 6/2002 | Wyers | |
| 2002/0127055 A1 | 9/2002 | Cole | |
| 2003/0230607 A1 | 12/2003 | Tweet et al. | |
| 2004/0227324 A1 * | 11/2004 | Popham | 280/478.1 |
| 2006/0103111 A1 * | 5/2006 | Popham | 280/478.1 |
| 2006/0201980 A1 | 9/2006 | Koons | |
| 2008/0231029 A1 | 9/2008 | Hummel | |
| 2009/0014574 A1 * | 1/2009 | Tollefson | 242/384.4 |
| 2009/0120984 A1 | 5/2009 | Sautter et al. | |
| 2009/0120986 A1 | 5/2009 | Sautter et al. | |
| 2010/0200822 A1 | 8/2010 | Kitchens, Sr. | |
| 2010/0294819 A1 * | 11/2010 | Spera | 224/519 |
| 2011/0248228 A1 * | 10/2011 | Gause | 254/323 |

* cited by examiner

*Primary Examiner* — Nathan J Newhouse
*Assistant Examiner* — Todd Anderson
(74) *Attorney, Agent, or Firm* — Goucher Patent Law; Tyler Goucher

(57) ABSTRACT

An apparatus and system for securing an item to a vehicle is disclosed. The apparatus includes an elongated cable, a retraction member, a coupling member, and a locking mechanism. The elongated cable is retractably received within the retraction member. The coupling member is secured to the retraction member. The coupling member is engageable with a vehicle receiver to secure the coupling member to the vehicle receiver. The vehicle receiver shaped to receive a separate hitch mounted accessory. The engagement between the coupling member and the vehicle receiver, in certain embodiments, is designed such that the vehicle receiver is accessible for receiving the separate hitch mounted accessory with the coupling member engaged with the vehicle receiver.

19 Claims, 7 Drawing Sheets

APPARATUS AND SYSTEM FOR SECURING AN ITEM TO A VEHICLE

FIELD

The subject matter of this application relates to vehicle security and more particularly relates to an apparatus and system for securing an item to a vehicle.

BACKGROUND

Many automobiles on the road today come with a receiver for towing trailers or other vehicles. The vehicle receiver consists of a square tube that mounts to the frame of the vehicle. The square tube has an opening that faces the rear of the vehicle. The opening is sized and shaped to receive an insertable portion of a removable ball mount. The removable ball mount, once coupled to the vehicle, can be used to tow a trailer or another vehicle.

In addition to items typically towed by personal vehicles such as a trailer or other vehicle, personal vehicles are increasingly being used to transport items such as bicycles, motorcycles, skis, and other cargo using the vehicles receiver. Specialty hitch mounted accessories have been developed to accommodate the transportation of these items. Common hitch mounted accessories include bicycle racks, ski racks, and platform cargo holders. With the relatively recent development of hitch mounted storage and transport accessories, more and more items are being transported using a vehicle receiver.

Each of the above identified common hitch mounted accessory includes an insertable portion that is received within opening in the square tube of the vehicle receiver. Thus, in order to couple the hitch mounted accessory to the vehicle receiver, the opening in the square tube of the vehicle receiver should be accessible.

One drawback to transporting an item on a hitch mounted accessory is the fact that because the hitch mounted accessory is coupled to the vehicle on the outside of the vehicle, the item is fairly unsecure. Any passerby can relatively easily remove the item from the hitch mounted accessory.

SUMMARY

From the foregoing discussion, it should be apparent that a need exists for an apparatus and system for securing an item to a vehicle. Beneficially, such an apparatus and system would leave the vehicle receiver accessible for receiving a separate hitch mounted accessory. Further, the apparatus and system is easily transferable between vehicles such that the apparatus provides a system and method for securing an item to any vehicle to which it is attached.

The present subject matter has been developed in response to the present state of the art, and in particular, in response to the problems and needs in the art that have not yet been fully solved by currently available vehicle security devices. Accordingly, the present subject matter has been developed to provide an apparatus and system for securing an item to a vehicle that overcome many or all of the above-discussed shortcomings in the art.

An apparatus for securing an item to a vehicle is presented. In one embodiment, the apparatus includes an elongated cable, a retraction member, a coupling member, and a locking mechanism. The elongated cable is retractably received within the retraction member. The coupling member, in certain embodiments, is secured to the retraction member. The coupling member is engageable with a vehicle receiver to secure the coupling member to the vehicle receiver. The vehicle receiver shaped to receive a separate hitch mounted accessory. The engagement between the coupling member and the vehicle receiver, in certain embodiments, is designed such that the vehicle receiver is accessible for receiving the separate hitch mounted accessory with the coupling member engaged with the vehicle receiver. In certain embodiments, the locking mechanism secured to the elongated cable. The locking mechanism is coupleable to an item to secure the item to the elongated cable. The elongated cable is secured to the retraction member in one embodiment. Thus, the elongated cable is secured to the vehicle by virtue of the coupling between the retraction member and the coupling member which is in turn secured to the vehicle.

In one embodiment, the coupling member is engageable with an outer surface of the vehicle receiver. In another embodiment, the coupling member is a tubular member sized to fit over the vehicle receiver.

The coupling member, in one embodiment, includes at least one substantially planar member having at least one opening disposed through the substantially planar member. The substantially planar member positionable adjacent to an outer surface of the vehicle receiver. A pinning member is positionable through the at least one opening in the substantially planar member and through an opening in the vehicle receiver to secure the coupling member to the vehicle receiver. In certain embodiments, the pinning member is also positionable through an opening in the separate hitch mounted accessory to secure the separate hitch mounted accessory to the vehicle receiver.

The retraction member, in certain embodiments, includes an opening sized to receive the separate hitch mounted accessory. In such an embodiment, the separate hitch mounted accessory is positionable through the opening in the retraction member and into the vehicle receiver.

In one embodiment, the coupling member includes at least one opening positionable adjacent to at least one opening in the vehicle receiver. A pinning member is positionable through the at least one opening in the coupling member and through at least one opening in the vehicle receiver to secure the coupling member to the vehicle receiver. In another embodiment, the at least one opening in the coupling member comprises at least two openings. The at least two openings in the coupling member are positionable adjacent to at least two openings in the vehicle receiver. In such an embodiment, the pinning member may be positionable through the at least two openings in the coupling member and through the at least two openings in the vehicle receiver to secure the coupling member to the vehicle receiver. In certain embodiments, the coupling member is shaped to enclose at least a portion of the vehicle receiver.

The apparatus, in a further embodiment, includes a winding mechanism. The winding mechanism, in one embodiment, includes a rotating member and a rotational force application member. The rotational force application member resiliently biases the rotating member in a wound position. In certain embodiments, at least a portion of the elongated cable is coupled to the rotating member and wherein the elongated cable is substantially retracted into the retraction member in the wound position.

An apparatus for securing an item to a vehicle is also presented that includes an elongated cable, a retraction member a coupling member, a locking mechanism and wherein a pinning member a pinning member is positionable through the at least one opening in the coupling member and through an opening in the vehicle receiver to secure the coupling member to the vehicle receiver. The elongated cable is retractably received within the retraction member. The coupling member, in certain embodiments, is secured to the retraction member. The coupling member is engageable with a vehicle receiver to secure the coupling member to the vehicle receiver. The vehicle receiver shaped to receive a separate hitch mounted accessory.

In certain embodiments, the locking mechanism secured to the elongated cable. The locking mechanism is coupleable to an item to secure the item to the elongated cable. The engagement between the coupling member and the vehicle receiver, in certain embodiments, is designed such that the vehicle receiver is accessible for receiving the separate hitch mounted accessory with the coupling member engaged with the vehicle receiver.

An apparatus for securing an item to a vehicle is also presented that includes an elongated cable, a retraction member, and a coupling member. The elongated cable is retractably received within the retraction member. The coupling member, in certain embodiments, is secured to the retraction member. The coupling member is engageable with a vehicle receiver to secure the coupling member to the vehicle receiver. The vehicle receiver shaped to receive a separate hitch mounted accessory. The engagement between the coupling member and the vehicle receiver, in certain embodiments, is designed such that the vehicle receiver is accessible for receiving the separate hitch mounted accessory with the coupling member engaged with the vehicle receiver.

Reference throughout this specification to features, advantages, or similar language does not imply that all of the features and advantages that may be realized with the present subject matter should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics of the subject matter may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments.

These features and advantages of the present subject matter will become more fully apparent from the following description and appended claims, or may be learned by the practice of the subject matter as set forth hereinafter.

BRIEF DESCRIPTION OF THE DRAWINGS

In order that the advantages of the subject matter will be readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present subject matter. Thus, appearances of the phrases "in one embodiment," "in an embodiment," and similar language throughout this specification may, but do not necessarily, all refer to the same embodiment.

Furthermore, the described features, structures, or characteristics of the subject matter may be combined in any suitable manner in one or more embodiments. In the following description, numerous specific details are provided for a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the subject matter.

Figure 1:
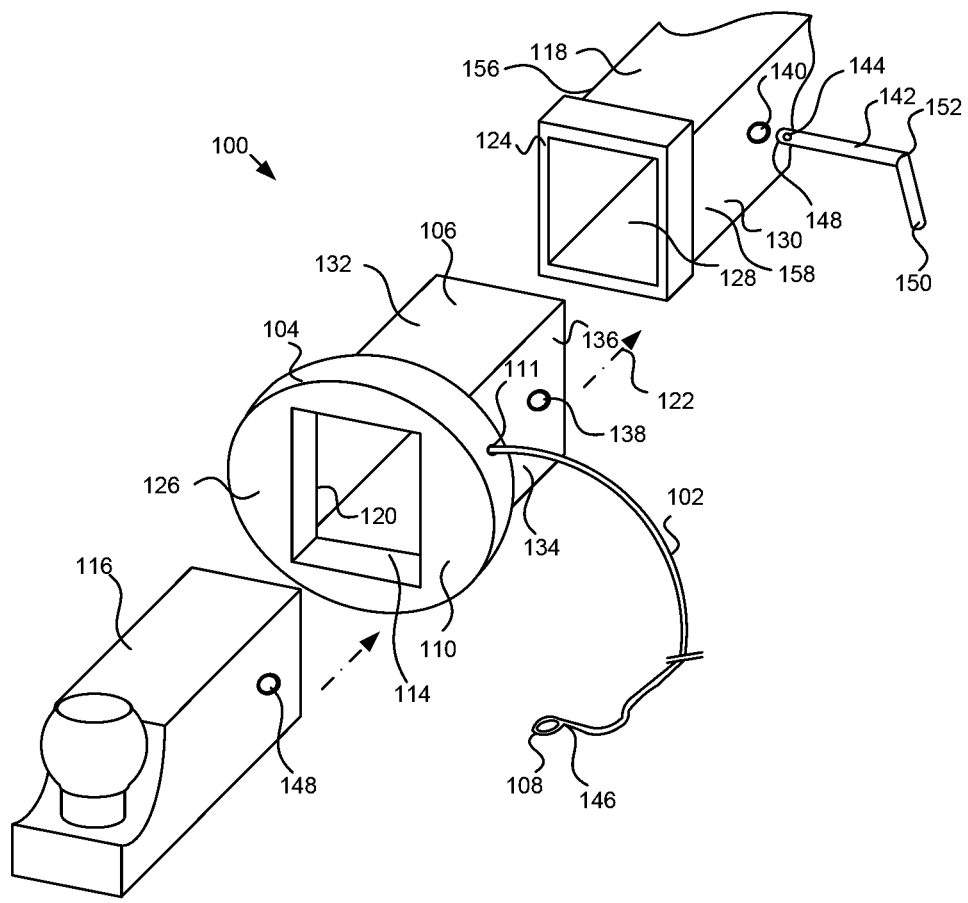
FIG. 1 depicts a perspective view of one embodiment of an apparatus for securing an item to a vehicle.

FIG. 1 depicts a perspective view of one embodiment of an apparatus 100 for securing an item to a vehicle. In certain embodiments the apparatus 100 includes an elongated cable 102, a retraction member 104, a coupling member 106, and a locking mechanism 108.

In one embodiment the retraction member 104 includes a housing 110 for retractably receiving the elongated cable 102. In certain embodiments, at least a portion of the elongated cable 102 is secured to the retraction member 104 such that, when the elongated cable 102 is withdraw from within the housing 110, the elongated cable 102 remains coupled to the retraction member. In other embodiments, the elongated cable 102 is retractably received within the retraction member 104 without being secured to the retraction member 104. In such an embodiment, the retraction member 104 operates as a storage receptacle for storing the elongated cable 102.

The housing 110 of the retraction member 104, in certain embodiments, includes a substantially cylindrical receptacle that houses the elongated cable 102 when the elongated cable 102 is retracted into the housing 110. In other embodiments, the housing 110 of the retraction member 104 may be any other geometric shape that provides a location for housing the elongated cable 102 when the elongated cable 102 is retracted into the housing 110.

The elongated cable 102 enters the housing 110 via opening 111. In one embodiment, the housing 110 may be made of a metallic material to protect the elongated cable 102 from tampering when the elongated cable 102 is received within the retraction member 104. In other embodiments, the housing 110 may be formed from a plastic material that protects the elongated cable 102 from the elements when the elongated cable 102 is received within the retraction member 104. Of course, one of skill in the art will recognize that in certain embodiments, the housing 110 may be formed from a combination of a metallic material and a plastic material. Similarly, one of skill in the art will recognize that in one embodiment, the housing 110 may be formed of a material other than a plastic or metallic material.

A passage 114 is disposed through the retraction member 104. In certain embodiments, the passage 114 is sized and shaped to accommodate a separate hitch mounted accessory 116. In such an embodiment, the passage 114 may only be large enough to accommodate a separate hitch mounted accessory 116 but not large enough to accommodate a vehicle receiver 118. In use, the vehicle receiver 118 is received within the coupling member 106. In embodiments where the passage 114 is only large enough to accommodate the separate hitch mounted accessory 116 but not large enough to accommodate the vehicle receiver 118, an inner wall 120 of the retraction member 104 arrests further insertion of the vehicle receiver 118 within the coupling member 106 in the direction of arrow 122. Thus, in such an embodiment, the front surface 124 of the vehicle receiver 118 is flush with the inner wall 120 of the retraction member 104.

In other embodiments, the passage 114 is sized and shaped to accommodate a vehicle receiver 118. In such an embodiment, the front surface 124 of the vehicle receiver 118 may extend beyond the inner wall 120 of the retraction member 104, through the passage 114 to, or beyond, the outer wall 126 of the retraction member 104.

In either of the above described embodiments, the vehicle receiver 118 is accessible for receiving the separate hitch mounted accessory 116 when the apparatus 100 is engaged with the vehicle receiver 118. Thus, with the apparatus 100 engaged with the vehicle receiver 118, the separate hitch mounted accessory 116 may be inserted through the passage 114 in the retraction member 104 and into the receiving space 128 in the vehicle receiver 118.

In certain embodiments, the elongated cable 102 enters the housing 110 through a passage 112. A winding mechanism positioned within the housing 110, as further described below, winds the elongated cable 108 around the passage 114. In certain embodiments, the winding mechanism automatically winds the elongated cable 108 around the passage 114. In other embodiments, the elongated cable 108 may be manually wound around the passage 114.

While only the vehicle receiver 118 is depicted in the Figures for clarity, one of skill in the art will recognize that the vehicle receiver 118 is typically secured to a rear portion of a vehicle. Thus, securing the apparatus 100 to the vehicle receiver effectively secures the apparatus to the vehicle and the elongated cable 102 can then be used to secure an item to the vehicle.

In certain embodiments, the coupling member 106 is secured to the retraction member 104. The coupling member 106 is engageble with the vehicle receiver 118 to secure the coupling member 106 to the vehicle receiver 118. In the embodiment illustrated in FIG. 1, the coupling member 106 is engageable with an outer surface 130 of the vehicle receiver 118 leaving the receiving space 128 in the vehicle receiver 118 accessible for inserting the separate hitch mounted accessory 116. For example, in one embodiment, the coupling member 106 is a tubular member 132 sized and shaped to fit over the vehicle receiver 118. With the coupling member 106 engaged with the outer surface 130 of the vehicle receiver 118, the receiving space 128 within the vehicle receiver 118 is accessible through the passage 114 in the retraction member 104.

In one embodiment, at least a portion of the coupling member 106 is substantially planar. For example, in the embodiment illustrated in FIG. 1, the side walls 134 are substantially planar members 136 that are positionable adjacent to the outer surface 130 of the vehicle receiver 118. Each substantially planar member 136 includes at least one opening 138 is disposed through the substantially planar member 136. In use, the opening or openings 138 in the substantially planar member 136 is aligned with an opening 140 in the vehicle receiver 118. A pinning member 142 is positioned through the opening 138 in the substantially planar member 136 of the coupling member 106 and through the opening 140 in the vehicle receiver 118 to secure the coupling member 106 to the vehicle receiver 118. Because the retraction member 106 is secured to the coupling member 106, the retraction member 106 is also secured to the vehicle receiver 118. In one embodiment, the substantially planar member 136 of the coupling member 106 may include a plurality of openings 138 positioned horizontally with each opening 138 positioned adjacent to another opening 138 along a horizontal axis to adjust the depth of the vehicle receiver 118 within the coupling member 106.

A conventional vehicle receiver, such as vehicle receiver 118, typically includes two openings disposed through each sidewall 156 and 158. In the embodiment illustrated in FIG. 1, only the opening 140 through sidewall 158 is illustrated. One of skill in the art will recognize that a second opening (not shown) is disposed through sidewall 156 and that the opening 140 in sidewall 158 is aligned with the opening (not shown) in sidewall 156. In securing the apparatus 100 to the vehicle receiver, the pinning member 142 may be positioned through the opening 138 in the substantially planar member 136 of the coupling member 106, through the opening 140 in the sidewall 158 of the vehicle receiver 118 and through the opening (not shown) in the opposite sidewall 156 of the vehicle receiver. In other embodiments, the pinning member 142 may only be positioned through one opening in one of the sidewalls 156, 158 of the vehicle receiver 118.

The pinning member 142, in certain embodiments, in further positionable through an opening 148 in the separate hitch mounted accessory 116 to secure the separate hitch mounted accessory 116 to the vehicle receiver 118. Thus, in one embodiment, the pinning member 142 secures both the coupling member 136 (and the retraction member 104) as well as the separate hitch mounted accessory 116 to the vehicle receiver 118.

In certain embodiments, the pinning member 142 includes a passage 144 through a first end 148 of the pinning member 142 for inserting a padlock or other locking device (not shown) once the pinning member has been positioned through the opening 138 in the substantially planar member 136 of the coupling member 106 and through the opening 140 in the vehicle receiver 118 to lock the coupling member 106 to the vehicle receiver 118. A second end 150 of the pinning member 142 is bent or is otherwise unable to be further inserted through the opening 138 in the substantially planar member 136 of the coupling member 106 and through the opening 140 in the vehicle receiver 118. The combination of a padlock or other locking device coupled to the passage 144 in the pinning member 142 and the bend 152 in the pinning member 142 operate to secure the pining member 142 within the opening 138 in the substantially planar member 136 of the coupling member 106 and the opening 140 in the vehicle receiver 118. In other embodiments, the pining member 142 may be a locking pinning member as is known in the art. With the coupling member 106 locked to the vehicle receiver, the elongated cable 102 can be used to secure items to the vehicle (not shown).

In one embodiment, a locking mechanism 108 is secured to the elongated cable 102. The locking mechanism 108 is coupleable to an item to secure the item to the elongated cable 102. In the embodiment illustrated in FIG. 1, the locking mechanism 108 is a loop of cable sized to receive a padlock or other locking device. In other embodiments, the locking mechanism 108 may include an integral locking device (not shown) coupled to a distal end 146 of the elongated cable 102. Such an integral locking device is within the skill of one skilled in the art.

In the embodiment illustrated in FIG. 1, the separate hitch mounted accessory 116 is a standard ball hitch used to tow a trailer or other towed vehicle. In other embodiments, the separate hitch mounted accessory 116 may be a hitch mounted bicycle carrier, a hitch mounted ski carrier, or any other device coupleable to the vehicle receiver 118.

With the coupling member 106 and the hitch mounted accessory 116 secured to the vehicle receiver 118 by a locking pinning member 142, the elongated cable 102 can be used to secure an item to the vehicle. For example, in use, the coupling member 106 is positioned over the vehicle receiver 118 and the separate hitch mounted accessory 116 is positioned within the receiving space 128 in the vehicle receiver 118. The pinning member 142 is positioned through the opening 138 in the coupling member 106 and through the openings 140 and 148 in the vehicle receiver 118 and the separate hitch mounted accessory 116 respectively. The pinning member 142 is then locked or otherwise secured to prohibit the removal of the pinning member 142. The elongated cable 102 can then be used to secure an item to the vehicle.

In embodiments where the separate hitch mounted accessory 116 is a standard ball hitch used to tow a trailer or other towed vehicle, the elongated cable 102 can be used to secure the trailer or other towed vehicle to the vehicle having the vehicle receiver 118. Where the separate hitch mounted accessory 116 is a hitch mounted bicycle or ski rack, the elongated cable can be used to secure a bicycle or a pair of skis to the vehicle having the vehicle receiver 118. One of skill in the art will recognize that other hitch mounted accessories 116 may be received within the vehicle receiver 118 to transport other items and that the elongated cable 102 may be used to secure these other items to the vehicle.

In certain embodiments, the apparatus 100 may be coupled to the vehicle receiver 118 without inserting a separate hitch mounted accessory 116 to the vehicle. In such an embodiment, the elongated cable 102 may still be used to couple an item to the vehicle.

Figure 2:
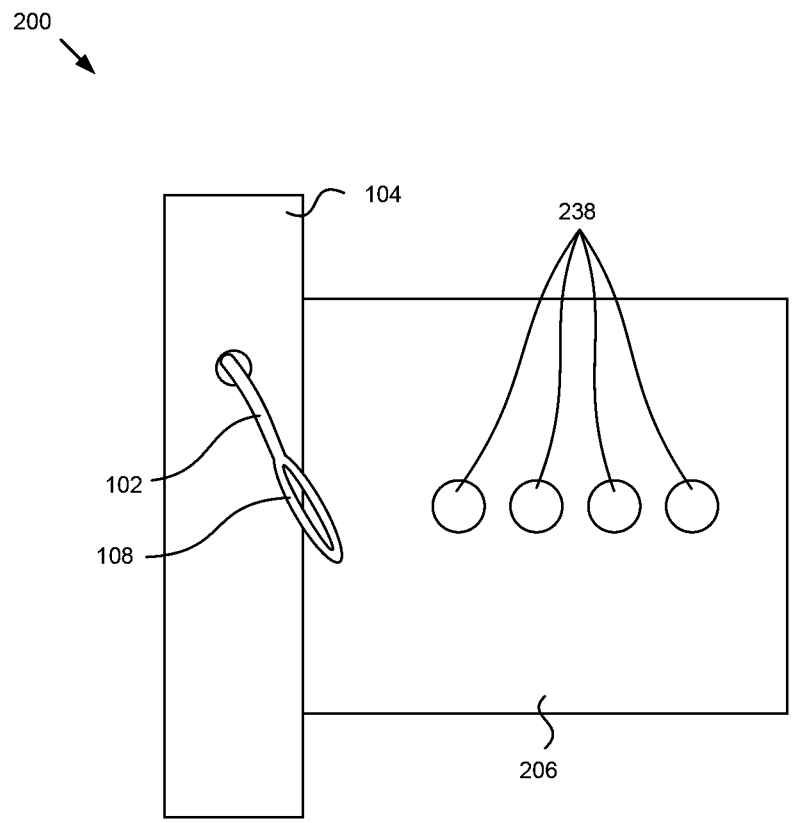
FIG. 2 depicts a side view of one embodiment of an apparatus for securing an item to a vehicle, the apparatus including a plurality of openings disposed through a coupling member for adjusting a position of the apparatus with respect to a vehicle receiver.

FIG. 2 depicts a side view of one embodiment of an apparatus 200 for securing an item to a vehicle. The apparatus 200 includes an elongated cable 102, a retraction member 104, a coupling member 206, and a locking mechanism 108. The elongated cable 102, retraction member 104, and the locking mechanism 108 of apparatus 200 are substantially similar to the elongated cable 102, retraction member 104, and the locking mechanism 108 of apparatus 100 described above.

As discussed above, in certain embodiments, the coupling member 206 includes a plurality of openings 238 disposed along a substantially planar member 136 of the coupling member 206. The openings 238 allow a user to adjust a depth of the vehicle receiver 118 with respect to the coupling member 206.

In one embodiment, the coupling member 206 includes a single substantially planar member 136 positionable adjacent to the outer surface 130 of the vehicle receiver 118. In such an embodiment, the coupling member 206 is secured to the vehicle receiver on only one side of the vehicle receiver 118.

Figure 3:
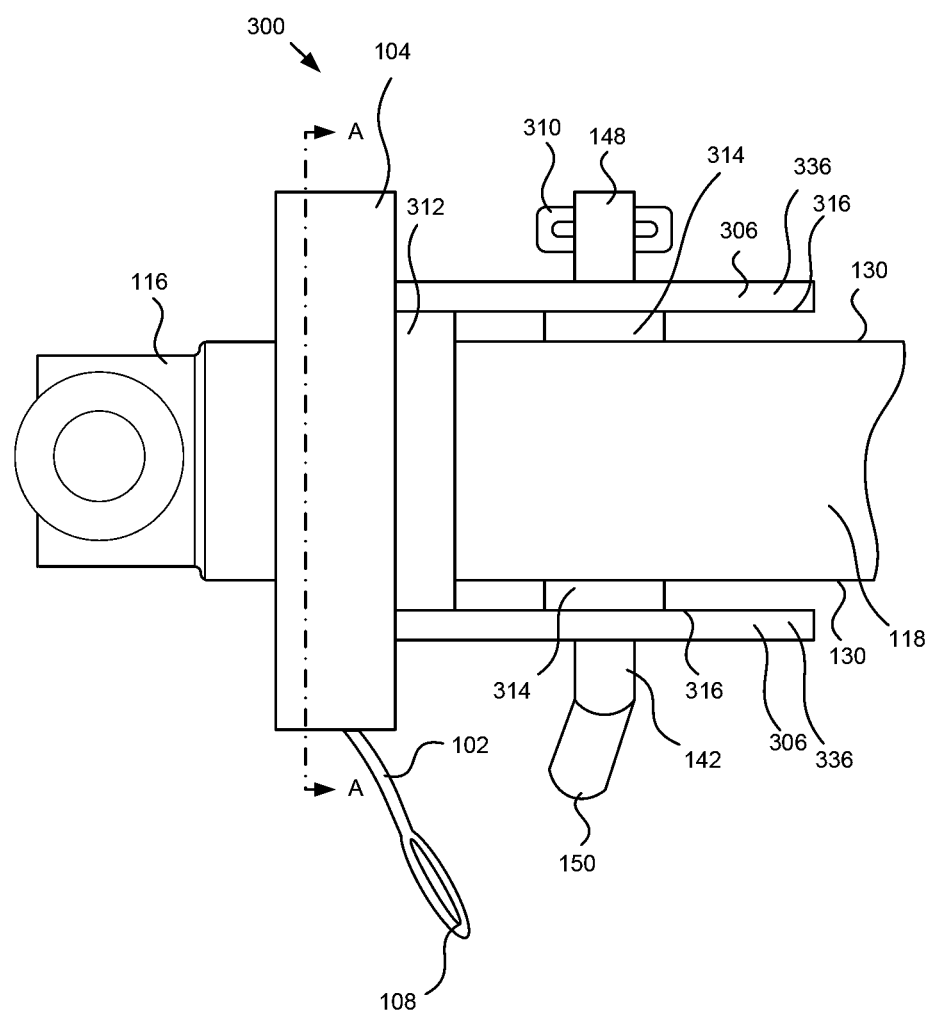
FIG. 3 depicts a top view of one embodiment of an apparatus for securing an item to a vehicle, the coupling member of the apparatus including a pair of substantially planar members.

FIG. 3 depicts a top view of one embodiment of an apparatus 300 for securing an item to a vehicle. The apparatus 300 includes an elongated cable 102, a retraction member 104, a pair of coupling members 306, and a locking mechanism 108. In certain embodiments, the elongated cable 102, the retraction member 104, and the locking mechanism 108 of apparatus 300 are substantially similar to the elongated cable 102 and retraction member 104 of apparatus 100 described above.

The coupling members 306, in one embodiment, include a pair of substantially planar members 336 positioned opposite one another. The substantially planar members 336 are positioned a sufficient distance apart to receive the vehicle receiver 118 between them. Each substantially planar member 336 includes at least one opening (not shown) sized to receive the pinning member 142.

In use, each substantially planar member 336 is positioned on opposing sides of the vehicle receiver 118 and the separate hitch mounted accessory is positioned within the receiving space 128 of the vehicle receiver 118. The pinning member 142 is positioned through the openings (not shown) in each substantially planar member 336, through the opening 140 (FIG. 1) in the in the vehicle receiver 118, and through the opening 148 in the separate hitch mounted accessory 116 to secure both the apparatus 300 and the separate hitch mounted accessory 116 to the vehicle. A padlock 310 or other locking device is positioned through the passage 144 in the first end 148 of the pinning member 142 to secure the pining member 142.

One of skill in the art will recognize that in certain embodiments the vehicle receiver 118 may include a flange 312 dispose around the outer surface 130 of the vehicle receiver 118. In such an embodiment, the substantially planar members 336 may not lie flat against the outer surface 130 of the vehicle receiver 118. This may cause the apparatus to wobble when positioned on the vehicle receiver 118. Therefore, in one embodiment, spacers 314 are positioned between the outer surface 130 of the vehicle receiver 118 and the inner surfaces 316 of the substantially planar members 336 to reduce play between these two surfaces.

Figure 4:
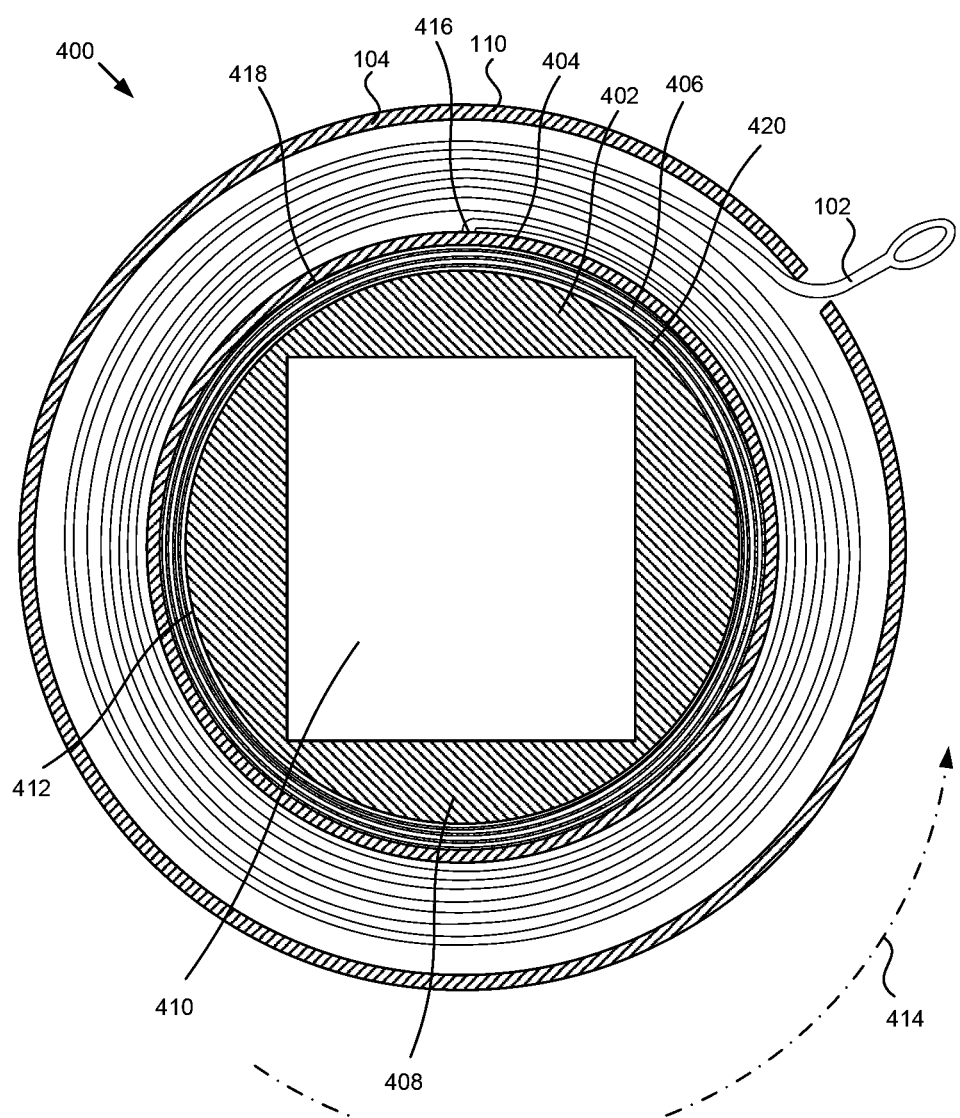
FIG. 4 is a cross section end view taken along line A-A of FIG. 3 depicting one embodiment of a winding mechanism for automatically retracting the elongated cable into the housing of the retraction member.

FIG. 4 is a cross section end view taken along line A-A of FIG. 3 depicting one embodiment of a winding mechanism 400 for automatically retracting the elongated cable 102 into the housing 110 of the retraction member 104. In certain embodiments the winding mechanism 400 includes a stationary member 402, a rotating member 404, and a rotational force application member 406.

The stationary member 402, in certain embodiments, is a circular plate 408 having a substantially square passage 410 disposed through substantially the center of the circular plate 408. In one embodiment the substantially square passage 410 engages one of the outer surface 130 of the hitch receiver 118 and the separate hitch mounted accessory to limit rotation of the stationary member 402.

In one embodiment, the rotating member 404 is a ring disposed around an outer circumference 412 of the stationary member 402. The rotating member 404 rotates around the stationary member 402 in the direction indicated by arrow 414. In certain embodiments, the elongated cable 102 is secured to the rotating member 404 at coupling point 416. As the rotating member 404 is rotated in the direction of arrow 414, the elongated cable 102 is wrapped around the rotating member 404 drawing the elongated cable 102 into the housing 110 of the retraction member 104 as illustrated in FIG. 4.

In certain embodiments, the rotational force application member 406 is positioned between the stationary member 402 and the rotating member 404. A first end 418 of the rotational force application member 406 is secured to the rotating member 404 and a second end 420 of the rotational force application member 406 is secured to the stationary member 402. The material comprising the rotational force application member 406 is capable of returning to its original shape such that the rotating member 404 is resiliently biased in a wound position. In the wound position, in one embodiment, the elongated cable 102 is substantially retracted into the housing 110 of the retraction member 104.

In one embodiment, the material comprising the rotational force application member 406 is also elastic enough to allow the elongated cable 102 to be withdrawn from within the housing 110 of the retraction member 104. In certain embodiments, as the elongated cable 102 is withdrawn from within the housing 110 of the retraction member 104, the rotational force applied to the elongated cable 102 by the rotational force application member 406 is increased.

In other embodiments, the rotational force applied to the elongated cable 102 by the rotational force application member 406 is constant no matter how far the elongated cable 102 is withdrawn from within the retraction member 104. One of skill in the art will recognize that the winding mechanism 400 for automatically retracting the elongated cable 102 into the housing 110 of the retraction member 104 illustrated in FIG. 4 depicts one exemplary embodiment for a winding mechanism 400. Other winding mechanisms are within the skill of one of ordinary skill in the art. For example, in certain embodiments, the winding mechanism 400 may include an electric motor (not shown) configured to automatically wind the elongated cable 102. In other embodiments, the winding mechanism 400 may include a manual mechanism for winding the elongated cable 102.

Figure 5:
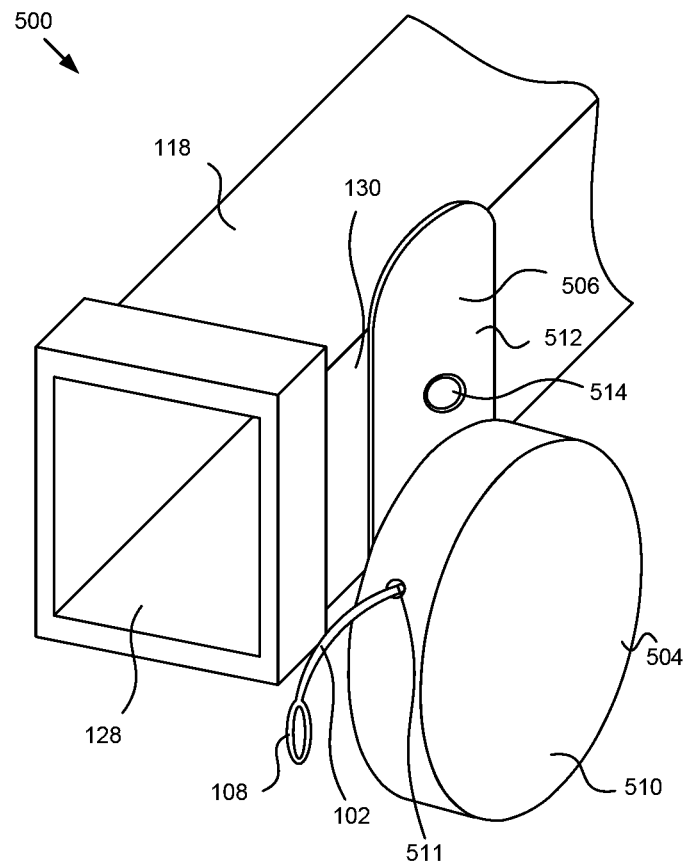
FIG. 5 depicts a perspective view of one embodiment of an apparatus for securing an item to a vehicle, the apparatus secured to a side of the vehicle receiver.

FIG. 5 depicts a perspective view of one embodiment of an apparatus 500 for securing an item to a vehicle. The apparatus 500 includes an elongated cable 102, a retraction member 504, a coupling member 506, and a locking mechanism 108. The elongated cable 102 and the locking mechanism 108 of apparatus 500, in certain embodiments, are substantially similar to the elongated cable 102 and the locking mechanism 108 of apparatus 100 described above.

In certain embodiments, the retraction member 504 may be positioned on a side of the vehicle receiver 118. In such an embodiment, a passage, such as the passage 114 in the retraction member 104 of apparatus 100 may be unnecessary as the receiving space 128 in the vehicle receiver 118 is accessible when the apparatus 500 is secured to the vehicle receiver 118. Thus, in certain embodiments, the passage 114 may be omitted from the retraction member 504 of apparatus 500.

In one embodiment, a winding mechanism, such as winding mechanism 400 described above, may be housed within the retraction member 504. In such an embodiment, the substantially square passage 410 in the stationary member 402 may be omitted as the receiving space 128 in the vehicle receiver 118 is accessible with the apparatus 500 secured to the vehicle receiver 118.

While the apparatus' 100, 200, 300, and 500 all discuss the retraction members 104 and 504 as including a winding mechanism 400, one of skill in the art will recognize that in certain embodiments the winding mechanism 400 may be omitted. In such an embodiment, the housing 110 and 510 of the retraction members 104 and 504 may simply operate as a housing to store the elongated cable 102. In embodiments where the winding mechanism 400 is omitted, a user may manually feed the elongated cable into the opening 111 (of housing 110) or opening 511 (of housing 510) to either store the elongated cable 102 or retract the elongated cable 102 from within the housing 110 or housing 510 for use in coupling an item to the vehicle.

The coupling member 506, in one embodiment, is a substantially planar member 512 positionable adjacent to the outer surface 130 of the vehicle receiver 118. In certain embodiments, the coupling member 506 includes at least one opening 514 disposed through the substantially planar member 512.

In use, the opening 514 in the substantially planar member 512 is aligned with the opening 140 in the vehicle receiver 118 and the pinning member 142 is positioned through the opening 514 in the substantially planar member 512 and the opening 140 in the vehicle receiver 118 to secure the coupling member 506 (and thus the apparatus 500) to the vehicle receiver 118. Of course, one of skill in the art will recognize that in certain embodiments, the separate hitch mounted accessory 116 may be positioned within the receiving space 128 of the vehicle receiver 118 before the pining member 142 is positioned through the opening 514 in the coupling member and the opening 140 in vehicle receiver 118 to secure the separate hitch mounted accessory 116 to the vehicle receiver 118.

In certain embodiments, the substantially planar member 512 may include a plurality of openings 514 to adjust a position of the apparatus 500 with respect to the vehicle receiver 118. In one embodiments, the substantially planar member 512 of the coupling member 506 may include a plurality of openings 514 positioned vertically with each opening positioned above or below another opening 514 to adjust a height of the coupling member 506. In another embodiment, the substantially planar member 512 of the coupling member 506 may include a plurality of openings 514 positioned horizontally with each opening 514 positioned adjacent to another opening 514 along a horizontal axis to adjust a depth of the coupling member 506 with respect to the front surface 124 of the vehicle receiver 118. In yet another embodiment, the substantially planar member 512 may include openings 514 arranged both vertically and horizontally to adjust both a height and a depth of the coupling member 506 with respect to the vehicle receiver 118. In each of these embodiments, the pining member 142 may be selectively positioned through one of the openings 514 to adjust the position of the retraction member 504 with respect to the vehicle receiver 118.

Figure 6:
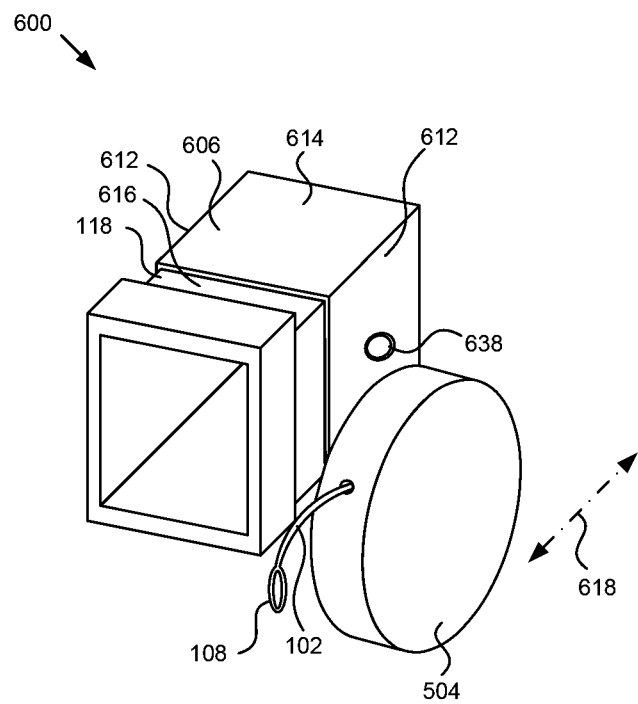
FIG. 6 depicts a perspective view of one embodiment of an apparatus for securing an item to a vehicle, the coupling member of the apparatus comprising a pair of substantially planar members positionable on either side of the vehicle receiver.

FIG. 6 depicts a perspective view of one embodiment of an apparatus 600 for securing an item to a vehicle. The apparatus 600 includes an elongated cable 102, a retraction member 504, a coupling member 606, and a locking mechanism 108. In certain embodiments, the elongated cable 102 and the locking mechanism 108 of apparatus 600 are substantially similar to the elongated cable 102 and the locking mechanism 108 of apparatus 100 described above. In one embodiment, the retraction member 504 of apparatus 600 is substantially similar to the retraction member 504 of apparatus 500 described above.

The coupling member 606, in one embodiment, includes a pair of substantially planar members 612 positioned opposite one another. The substantially planar members 612 are connected to each other by a bridging member 614. The bridging member 614 spans the distance of the top surface 616 of the vehicle receiver 118 such that each of the substantially planar members 612 are positioned adjacent to the outer surface 130 of the vehicle receiver 118 on opposite sides of the vehicle receiver 118.

In certain embodiments, each of the substantially planar members 612 includes an opening 638 through which the pinning member 142 is positioned to secure the coupling member 606 to the vehicle receiver 118. In other embodiments, each of the substantially planar members 612 includes a plurality of opening 638 positioned above one another to adjust the height of the apparatus 600 with respect to the vehicle receiver. In yet another embodiment, each of the substantially planar members 612 includes a plurality of opening 638 positioned adjacent to one another at substantially the same distance from the bridging member 614 such that the position of the coupling member 606 with respect to the vehicle receiver 118 can be adjusted in the direction indicated by arrows 618.

Figure 7:
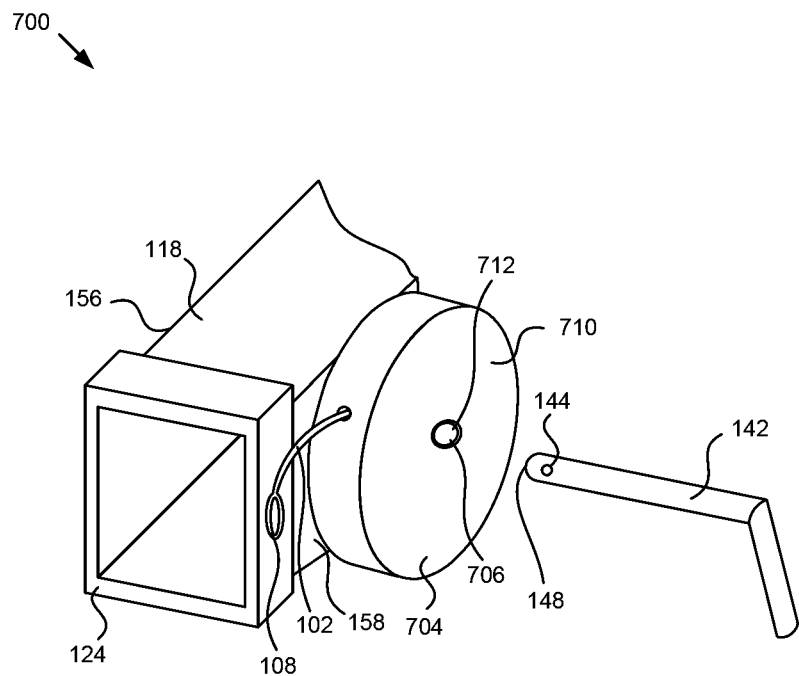
FIG. 7 depicts a perspective view of one embodiment of an apparatus for securing an item to a vehicle, the coupling member of the apparatus comprising a passage disposed through the retraction member.

FIG. 7 depicts a perspective view of one embodiment of an apparatus 700 for securing an item to a vehicle. The apparatus 700 includes an elongated cable 102, a retraction member 704, a coupling member 706, and a locking mechanism 108. The elongated cable 102 and the locking mechanism 108 of apparatus 700, in certain embodiments, are substantially similar to the elongated cable 102 and the locking mechanism 108 of apparatus 100 discussed above.

In one embodiment, the retraction member 704 includes a housing 710 for receiving the elongated cable 102. In certain embodiments, a winding mechanism, substantially similar to the winding mechanism 400 of FIG. 4 may be housed within the housing 710. As discussed above, the winding mechanism 400 automatically retracts the elongated cable 102 into the housing 710. In other embodiments, the elongated cable 102 may be manually fed into the housing 710. In such an embodiment, the winding mechanism may be omitted.

In certain embodiments, the coupling member 706 is an opening 712 disposed through the housing 710 of the retraction member 704. To secure the apparatus 700 to the vehicle receiver 118, the pinning member 142 is positioned through the opening 712 in the housing 710 and through at least one of the openings in the one of the sidewalls 156, 158 of the vehicle receiver 118. To secure the pining member 142 in place within at least one of the openings in the one of the sidewalls 156, 158 of the vehicle receiver 118 a padlock, such as padlock 310 (FIG. 3) or other locking device is positioned through the passage 144 in the first end 148 of the pinning member 142.

The present subject matter may be embodied in other specific forms without departing from its spirit or essential characteristics. The described embodiments are to be considered in all respects only as illustrative and not restrictive. The scope of the subject matter is, therefore, indicated by the appended claims rather than by the foregoing description. All changes which come within the meaning and range of equivalency of the claims are to be embraced within their scope.

What is claimed is:

1. An apparatus to secure an item to a vehicle, the apparatus comprising:
    an elongated cable;
    a retraction member, the elongated cable received within the retraction member, wherein the retraction member includes an opening sized to receive a separate hitch mounted accessory; and
    a coupling member secured to the retraction member, the coupling member including at least one opening, the coupling member engageable with a vehicle receiver to secure the coupling member to the vehicle receiver, the vehicle receiver shaped to receive the separate hitch mounted accessory, wherein the vehicle receiver is accessible for receiving the separate hitch mounted accessory with the coupling member engaged with the vehicle receiver and wherein the separate hitch mounted accessory is positionable through the opening in the retraction member and into the vehicle receiver.

2. An apparatus to secure an item to a vehicle, the apparatus comprising:
    an elongated cable;
    a retraction member, the elongated cable retractably received within the retraction member, wherein the retraction member includes an opening sized to receive a separate hitch mounted accessory;
    a coupling member secured to the retraction member, the coupling member engageable with a vehicle receiver to secure the coupling member to the vehicle receiver, the vehicle receiver shaped to receive the separate hitch mounted accessory, wherein the vehicle receiver is accessible for receiving the separate hitch mounted accessory with the coupling member engaged with the vehicle receiver and wherein the separate hitch mounted accessory is positionable through the opening in the retraction member and into the vehicle receiver; and
    a locking mechanism secured to the elongated cable, wherein the locking mechanism is coupleable to an item to secure the item to the elongated cable.

3. The apparatus of claim 2, wherein the coupling member is engageable with an outer surface of the vehicle receiver.

4. The apparatus of claim 2, wherein the coupling member comprises a tubular member sized to fit over the vehicle receiver.

5. The apparatus of claim 2, wherein the coupling member comprises at least one substantially planar member having at least one opening disposed through the substantially planar member, the substantially planar member positionable adjacent to an outer surface of the vehicle receiver, wherein a pinning member is positionable through the at least one opening in the substantially planar member and through an opening in the vehicle receiver to secure the coupling member to the vehicle receiver.

6. The apparatus of claim 5, wherein the pinning member is further positionable through an opening in the separate hitch mounted accessory to secure the separate hitch mounted accessory to the vehicle receiver.

7. The apparatus of claim 2, wherein the coupling member includes at least one opening positionable adjacent to at least one opening in the vehicle receiver, wherein a pinning member is positionable through the at least one opening in the coupling member and through the at least one opening in the vehicle receiver to secure the coupling member to the vehicle receiver.

8. The apparatus of claim 7, wherein the at least one opening in the coupling member comprises at least two openings, the at least two openings in the coupling member positionable adjacent to at least two openings in the vehicle receiver, wherein a pinning member is positionable through the at least two openings in the coupling member and through the at least two openings in the vehicle receiver to secure the coupling member to the vehicle receiver.

9. The apparatus of claim 2, wherein the coupling member includes a plurality of openings, wherein a pinning member is selectively positionable through at least one of the plurality of openings to adjust a position of the retraction member with respect to the vehicle receiver.

10. The apparatus of claim 2, wherein the coupling member is shaped to enclose at least a portion of the vehicle receiver.

11. The apparatus of claim 2, wherein at least a portion of the elongated cable is secured to the retraction member.

12. The apparatus of claim 2, further comprising a winding mechanism, the winding mechanism comprising a rotating member and a rotational force application member, the rotational force application member resiliently biasing the rotating member in a wound position.

13. The apparatus of claim 12, wherein at least a portion of the elongated cable is coupled to the rotating member and wherein the elongated cable is substantially retracted into the retraction member in the wound position.

14. An apparatus to secure an item to a vehicle, the apparatus comprising:
- an elongated cable;
- a retraction member, the elongated cable received within the retraction member, wherein the retraction member includes an opening sized to receive a separate hitch mounted accessory;
- a coupling member secured to the retraction member, the coupling member including at least one opening, the coupling member engageable with a vehicle receiver to secure the coupling member to the vehicle receiver, the vehicle receiver shaped to receive the separate hitch mounted accessory, wherein the vehicle receiver is accessible for receiving the separate hitch mounted accessory with the coupling member engaged with the vehicle receiver and wherein the separate hitch mounted accessory is positionable through the opening in the retraction member and into the vehicle receiver;
- a locking mechanism secured to the elongated cable, wherein the locking mechanism is coupleable to an item to secure the item to the elongated cable; and
- wherein a pinning member is positionable through the at least one opening in the coupling member and through an opening in the vehicle receiver to secure the coupling member to the vehicle receiver.

15. The apparatus of claim 14, wherein the pinning member is further positionable through an opening in the separate hitch mounted accessory to secure the separate hitch mounted accessory to the vehicle receiver.

16. The apparatus of claim 14, wherein the coupling member comprises a tubular member sized to fit over the vehicle receiver.

17. The apparatus of claim 14, wherein the coupling member comprises at least one substantially planar member and wherein the at least one opening is disposed through the substantially planar member, the substantially planar member positionable adjacent to an outer surface of the vehicle receiver, wherein a pinning member is positionable through the at least one opening in the substantially planar member and through an opening in the vehicle receiver to secure the coupling member to the vehicle receiver.

18. The apparatus of claim 14, wherein the at least one opening in the coupling member includes a plurality of openings, wherein the pinning member is selectively positionable through at least one of the plurality of openings to adjust a position of the retraction member with respect to the vehicle receiver.

19. The apparatus of claim 14, further comprising a winding mechanism, the winding mechanism comprising a rotating member and a rotational force application member, the rotational force application member resiliently biasing the rotating member in a wound position.

* * * * *